United States Patent
Zúñiga Sagredo

(10) Patent No.: US 11,021,227 B2
(45) Date of Patent: Jun. 1, 2021

(54) ACCESS COVER

(71) Applicant: AIRBUS OPERATIONS SL, Getafe (ES)

(72) Inventor: Juan Zúñiga Sagredo, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 293 days.

(21) Appl. No.: 16/119,195

(22) Filed: Aug. 31, 2018

(65) Prior Publication Data

US 2019/0127041 A1 May 2, 2019

(30) Foreign Application Priority Data

Oct. 27, 2017 (EP) .................................... 17382722

(51) Int. Cl.
| | | |
|---|---|---|
| *B64C 1/14* | (2006.01) | |
| *E05C 5/02* | (2006.01) | |
| *F16B 2/12* | (2006.01) | |
| *F16B 2/06* | (2006.01) | |
| *E05B 65/00* | (2006.01) | |
| *B64C 3/34* | (2006.01) | |

(52) U.S. Cl.
CPC .............. *B64C 1/14* (2013.01); *B64C 1/1446* (2013.01); *B64C 3/34* (2013.01); *E05C 5/02* (2013.01); *F16B 2/065* (2013.01); *F16B 2/12* (2013.01); *E05B 65/006* (2013.01)

(58) Field of Classification Search
CPC ....... B64C 1/14; B64C 1/1446; B64C 1/1407; B64C 2001/009; B64D 29/08
See application file for complete search history.

(56) References Cited

U.S. PATENT DOCUMENTS

| | | | | |
|---|---|---|---|---|
| 2,368,713 A | | 2/1945 | Kane | |
| 4,125,140 A | * | 11/1978 | Basile | ...................... B64C 1/14 411/106 |
| 4,964,594 A | * | 10/1990 | Webb | ........................ B64C 1/12 244/129.3 |
| 5,868,355 A | * | 2/1999 | Carter, Jr. | ............... B63B 19/08 114/117 |
| 6,513,841 B1 | * | 2/2003 | Jackson | ................. B64D 29/06 292/126 |

(Continued)

FOREIGN PATENT DOCUMENTS

FR 3049509 A1 10/2017

OTHER PUBLICATIONS

European Search Report; priority document.

*Primary Examiner* — Richard R. Green
*Assistant Examiner* — William L Gmoser
(74) *Attorney, Agent, or Firm* — Greer, Burns & Crain, Ltd.

(57) ABSTRACT

An access cover for an aircraft hole that comprises a plurality of access cover holes, an inner surface, a plurality of first projections protruding from the inner surface, and a plurality of fixing elements configured to fix the access cover to a supporting structure of the aircraft hole. The fixing elements each comprise a male fixing element having an outer threaded surface, the male fixing element being configured to pass through a hole, and a locking element comprising a threaded hole and an extended portion, wherein the outer threaded surface of the male fixing element is configured to thread with the threaded hole of the locking element.

8 Claims, 5 Drawing Sheets

(56) References Cited

U.S. PATENT DOCUMENTS

| | | |
|---|---|---|
| 8,656,645 B1 | 2/2014 | Chwala |
| 10,427,616 B2 * | 10/2019 | Wilckens ................ F16B 21/04 |
| 2005/0121554 A1 | 6/2005 | Fournie et al. |
| 2014/0223829 A1 * | 8/2014 | Korenaga ............. B64C 1/1461 |
| | | 49/483.1 |

* cited by examiner

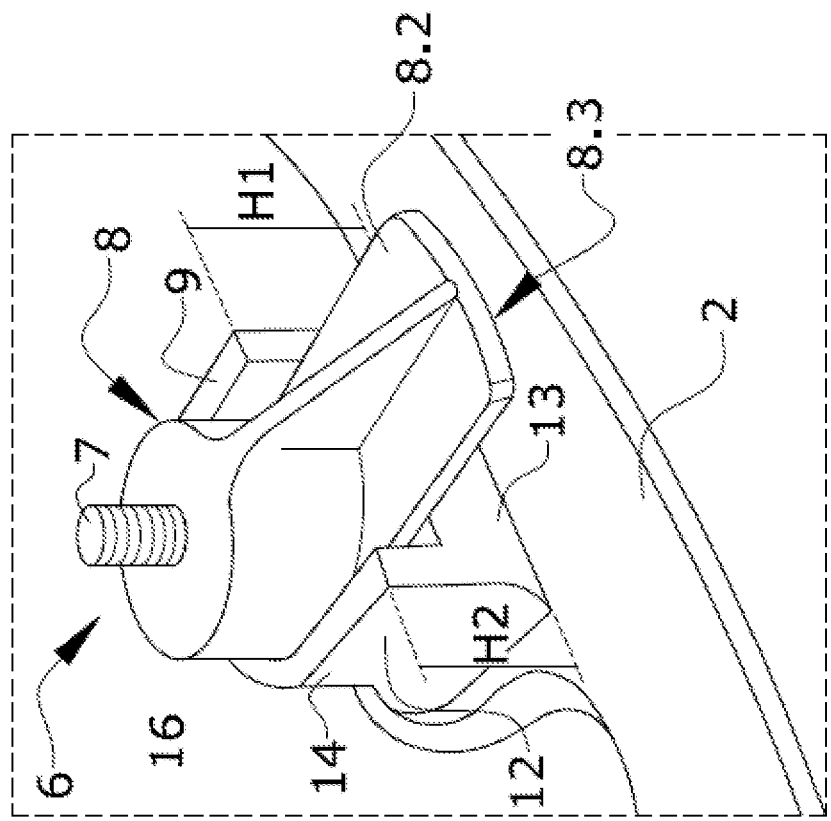
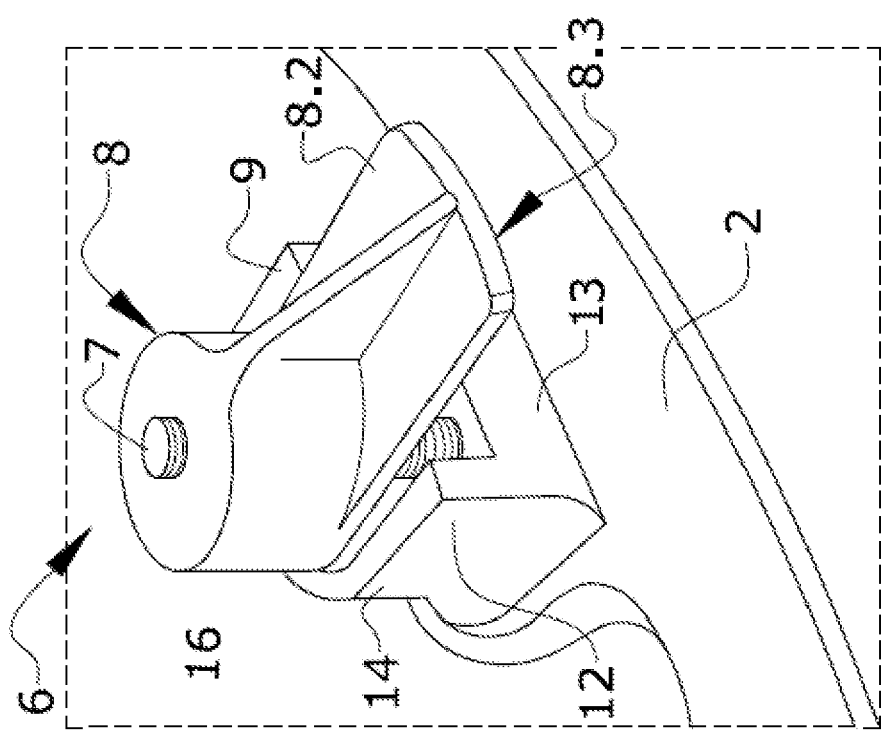

ACCESS COVER

CROSS-REFERENCES TO RELATED APPLICATIONS

This application claims the benefit of the European patent application No. 17382722.1 filed on Oct. 27, 2017, the entire disclosures of which are incorporated herein by way of reference.

TECHNICAL FIELD OF THE INVENTION

The present invention belongs to the field of access to aircraft structures for normal operation and maintenance and, particularly, to the field of access covers for any aircraft holes, more particularly external holes. The invention relates to an access cover for an aircraft hole configured to be fixed to a supporting structure of the aircraft hole.

BACKGROUND OF THE INVENTION

In current aircraft, there are numerous access cover types for aircraft holes which include quick release systems. These current access covers may be loaded, non-loaded, multiple-part systems, sealed, with or without holes on the structure, etc.

These known access covers may be arranged in many parts of the aircraft, for example on a wing, more particularly on the torsion box of a wing. An example of a type of access cover usually arranged on aircraft holes of a wing is an access cover which is non-load carrying and is made of two parts, an inner and outer part, assembled by means of several screws. This configuration of access cover disadvantageously requires a narrow tolerance in order to properly attach to the wing structure.

In addition, this type of cover usually has interchangeability requirements between aircraft and different locations in such aircraft. Further, the external surface flush requirements of the outer part of the cover are fulfilled by a recess formed on the supporting structure of the hole. Therefore, it is necessary to form a recess on the supporting structure of the hole. Additionally, such access cover is detached/attached involving the two separate parts and the screws, which disadvantageously causes a complex and slow assembly.

Furthermore, the current access covers are assembled from the bottom of the torsion box of the wing and a platform or means to reach the location are required. Therefore, ease of assembly is an important factor as well.

The access covers must fulfill aeronautical requirements in order not to penalize the performance of the vehicle. Additionally, the access covers must withstand the aero loading or sympathetic loads from the aircraft structure and also be easily replaceable for efficient in-service operation.

SUMMARY OF THE INVENTION

In a first inventive aspect, the invention provides an access cover for an aircraft hole, the access cover comprising:
   a plurality of holes,
   an inner surface intended for being faced towards the aircraft hole,
   a plurality of first projections protruding from the inner surface, and
   a plurality of fixing means configured to fix the access cover to a supporting structure of the aircraft hole, each fixing means comprising:
      a male fixing element having an outer threaded surface, the male fixing element being configured to pass through a hole, and
      a locking element comprising a threaded hole and an extended portion, wherein the outer threaded surface of the male fixing element is configured to thread with the threaded hole of the locking element, wherein the male fixing elements, the locking elements and the first projections are configured such that when a male fixing element inserted through a hole and through a locking element, and is rotated in a lock direction, the friction between the male fixing element and the locking element causes the locking element to rotate with the male fixing element until the rotation of the locking element is stopped by a first projection, and further rotation of the male fixing element in the lock direction causes the threading of the locking element with the male fixing element.

The present access cover is a single part access cover which comprises two surfaces, namely an inner and outer surface, so that when such access cover is arranged or fixed to the aircraft hole, the inner surface is faced inside the aircraft hole and the outer surface is faced outward of the aircraft hole. To fix the access cover to the supporting structure of the aircraft hole, the access cover comprises a plurality of fixing means.

The fixing means are configured to rotate to lock/unlock the access cover and also to tighten the access cover to the supporting structure of the hole. Each fixing means comprises a male fixing element and a locking element. The male fixing element comprises a head and an elongate portion having an outer threaded surface, wherein through the head the screwing of the elongate portion is guided from the outside of the aircraft hole. The male fixing element will be understood as a screw which outer threaded surface is configured to thread with a threaded hole of the locking element. Furthermore, the locking element is configured to rotate around the male fixing element or to rotate with the male fixing element.

The locking element of the fixing means will be understood as a self-tightening nut for the present invention. The fixing means, and more particularly the male fixing element and the locking element, comprise two directions of movement, a lock direction and a release direction, each direction being opposed to the other.

The locking element rotates in a first direction (lock direction) to be locked so that the access cover is fixed to the supporting structure of the aircraft hole and also rotates in a second direction (release direction) to allow the removal of the access cover from the aircraft access hole.

The access cover further comprises a plurality of first projections; each projection will be understood as a stop adapted to stop or block the rotational movement of the locking element.

To fix the access cover to the supporting structure of the aircraft hole, the access cover is positioned on the aircraft hole, with the male fixing element inserted through a hole and through a locking element. The locking element is kept attached to the access cover by the male fixing element. When the male fixing element is rotated in a lock direction, friction between the outer threaded surface of such male fixing element and the threaded hole of the locking element causes the locking element to rotate with the male fixing element over the inner surface of the access cover until the locking element is stopped by a first projection which abuts the extended portion of the locking element and prevents further rotation in the same direction (lock direction). Once the first projection stops the rotational movement of the locking element, when the male fixing element is further rotated in the lock direction, the male fixing element is threaded through the locking element. Threading of the locking element on the male fixing element causes a relative movement between the locking element and the male fixing element, the locking element approaching the head of the male fixing element as the male fixing element is further rotated in the lock direction.

Thus, the present invention allows adjusting to the thickness of the supporting structure for clamping the access cover in the aircraft hole.

Since the access cover is a single part with fixing means which are easy fixing components, the present access cover advantageously is attached and/or detached without involving separate parts or complex fixing means with a plurality of components. Thus, the whole assembly of the access cover is handled as one item where no elements and/or components can be lost. Additionally, the present configuration of the access cover allows that the access cover can be completely detached from the aircraft hole while maintaining each male fixing element and each locking element mounted on the access cover. That is, the male fixing element is in contact with the locking element all the time and there is no need to remove the male fixing elements and the locking elements to detach the access cover from the aircraft hole.

In addition, the access cover is advantageously quick to attach and/or detach in a simple way with standard tools, for example with a screwdriver.

Furthermore, the access cover advantageously is able to be adjusted to a high thickness range of the supporting structure of the aircraft hole including wide tolerances. Also, advantageously, the access cover does not transfer loads from the supporting structure of the aircraft hole avoiding the need of any extra reinforcement (and weight). This advantage is because the attachment between the access cover and the supporting structure of the aircraft hole does not require holes in the supporting structure and the access cover is fastened to the supporting structure by the fixing means. In this type of attachment, the supporting structure only transfers friction load, and it is negligible. Further, the present access cover advantageously has the ability to slide slightly on the supporting structure.

In a particular embodiment, the inner surface comprises a peripheral portion suitable for being supported on a supporting structure of the aircraft hole. In this embodiment the access cover comprises a peripheral portion arranged along the whole edge perimeter of the access cover structure. This peripheral portion is intended for being in contact with the supporting structure of the aircraft hole when the access cover is arranged on and/or fixed to the aircraft hole.

In a particular embodiment, in a position where the rotational movement of the locking element is limited by a first projection, the extended portion of the locking element is over the peripheral portion.

In a particular embodiment, in a position where the rotational movement of the locking element is limited by a first projection, the extended portion of the locking element protrudes beyond the peripheral portion.

In a particular embodiment, the access cover comprises a plurality of second projections protruding from the inner surface, wherein each second projection is configured to limit the rotational movement of a locking element when a male fixing element inserted through a hole and through the locking element is rotated in a release direction, the release direction being opposite to the lock direction, and wherein the first projection has a first height respect to the inner surface and the second projection has a second height respect to the inner surface, the second height being smaller than the first height.

According to this particular embodiment, the access cover comprises two main positions for fixing means: a lock position and an unlock position. In the lock position the rotational movement of the locking element in the release direction is stopped by the second projection and the rotational movement in the lock direction is stopped by the first projection. Thus, in the lock position, the locking element cannot rotate in any direction (lock and release direction). Furthermore, in the unlock position the rotational movement of the locking element in the lock direction is also stopped by the first projection, but the locking element can rotate in the release direction. Preferably, in the lock position and the unlock position the extended portion of the locking element is over the peripheral portion, and also may protrude beyond the peripheral portion.

The difference of heights between the first and second projection allows the locking element to rotate over the second projection in the release direction at the same time that allows the locking element to rotate in the lock direction until it is stopped by the first projection. Once the locking element is stopped by the first projection, the male fixing element further rotates in the lock direction and causes the locking element to approach to the inner surface of the access cover so that the extended portion of the locking element is arranged between the first and second projection. When the extended portion is located between both projections, the locking element cannot rotate in any of the directions (lock and release direction) but it can approach to the inner surface or move away from the inner surface.

Further, the second projection advantageously helps, together with the first projection, guiding the locking element to lock the access cover to the supporting structure of the aircraft hole in the threading of the male fixing element through the locking element.

The access cover further comprises a release position for fixing means wherein the locking element is over the inner surface and does not protrude beyond the peripheral portion. Thus, in this release position, the access cover can be attached to and/or detached from the aircraft hole without the fixing means hindering such movements of attach/detach.

In a more particular embodiment, each second projection defines together with a first projection a housing comprising a wall extending from the first projection to the second projection.

Advantageously, this housing also helps to guide the locking element for locking the access cover to the supporting structure of the aircraft hole.

In a more particular embodiment, the wall of the housing has a height with respect to the inner surface which progressively increases from the second projection to the first projection.

In a particular embodiment, the access cover comprises a plurality of outstanding portions, wherein each outstanding portion protrudes from the inner surface and wherein each hole is located in an outstanding portion so that the hole thickness increases.

These outstanding portions provide a higher thickness of the access cover in the regions where the holes are arranged. Such outstanding portions thus act as reinforcements which advantageously provide a higher strength region of the access cover that is considered the region of greatest stress. This region is where the fixing means are located along the access cover.

In a particular embodiment, the holes are distributed in a substantially circular shape and spaced apart. In a particular embodiment, a central portion of the access cover has a thickness smaller than the thickness at a peripheral portion of the access cover.

The difference of thickness between the central portion and the peripheral portion advantageously provides a weight reduction of the access cover thanks to the lower thickness of the central portion, and also provides a reinforcement region of the access cover thanks to the higher thickness of the peripheral portion.

In a particular embodiment, the extended portion of the locking element comprises a third projection intended for contacting with the supporting structure of the aircraft hole. Advantageously, the third projection allows maintain the supporting structure between the access cover and such third projection. Thus, the contact surface between the supporting structure and the locking element, when the access cover is fixed to the supporting structure, is reduced. Therefore it is avoided that the base of the locking element contacts with the edge of the supporting structure of the aircraft hole which in some embodiments is a critical region of the aircraft hole.

In a second inventive aspect, the invention provides an aircraft comprising:
at least an aircraft hole, and
an access cover according to any of the embodiments according to the first inventive aspect.

The aircraft holes comprise a supporting structure which is considered the region of the structure of the aircraft where the aircraft hole is located, near to the hole. That is the supporting structure is understood as the structural region which surrounds the aircraft hole.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIG. 4 shows a perspective view of a fixing means in an unlock position according to an embodiment of the present invention.

FIG. 5 shows a perspective view of a fixing means in a lock position according to an embodiment of the present invention.

DETAILED DESCRIPTION OF THE PREFERRED EMBODIMENTS

Figure 1:
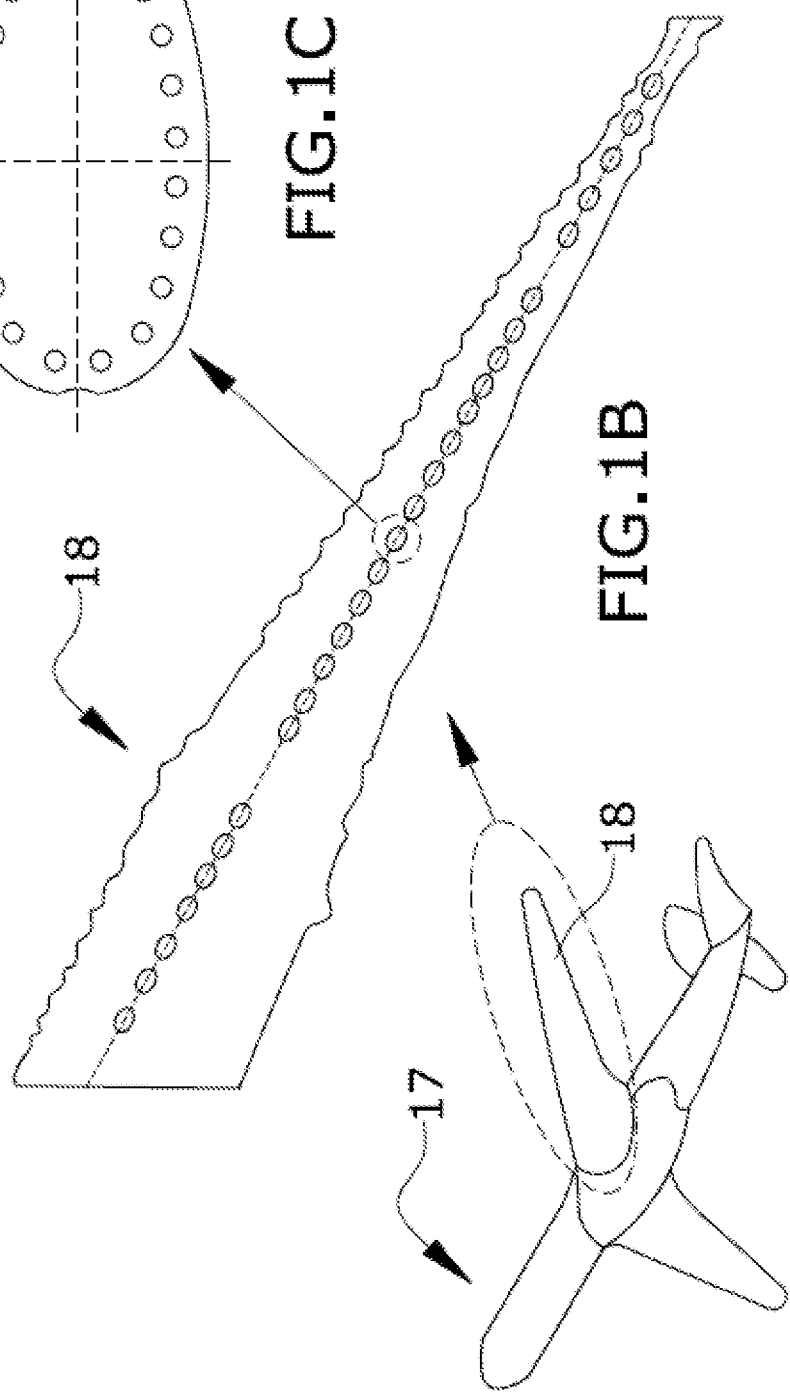
FIG. 1A shows an embodiment of an aircraft wherein the left wing is marked with dotted line.
FIG. 1B shows the locations of the wing of the aircraft shown in FIG. 1A where an access cover is located.
FIG. 1C shows an access cover according to an embodiment of the present invention.

FIG. 1A shows a perspective view of an aircraft (17) with its left wing (18) circled with a dotted line. The wing (18) is shown in FIG. 1B indicating the location where an access cover (1) is arranged. FIG. 1C shows an upper view of the outer surface of the access cover located in an aircraft hole (11) (FIG. 2) located in the wing (18).

Figure 2:
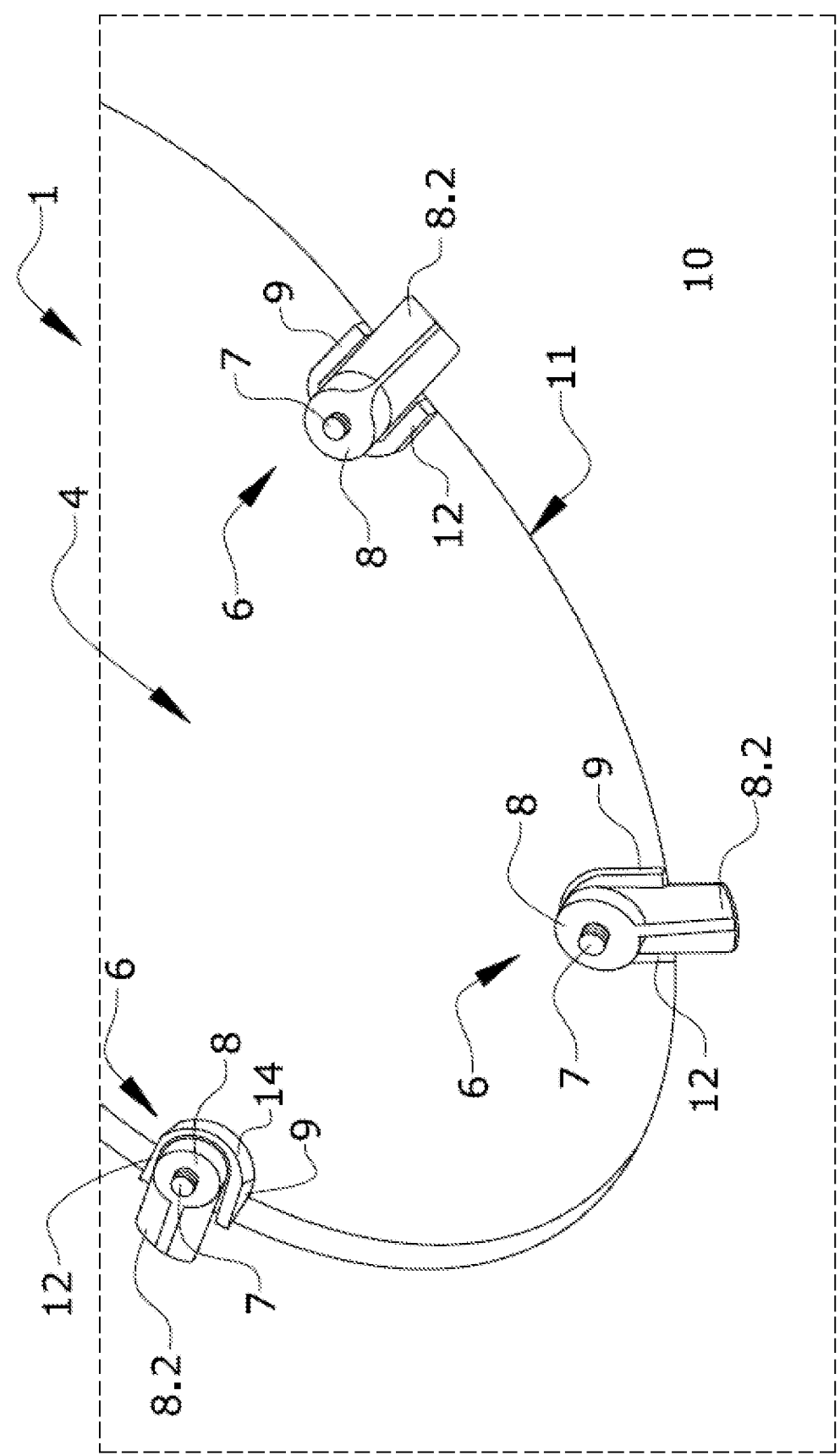
FIG. 2 shows an upper perspective view of an access cover fixed to the supporting structure of an aircraft hole according to an embodiment of the present invention.

FIG. 2 shows a partial view of an access cover (1) according to the invention from inside the aircraft hole (11), more in particular, the inner surface (4) of the access cover (1) is shown, which is faced to inside the aircraft hole (11) when the access cover is fixed to the supporting structure (10) of the aircraft hole (11).

The access cover (1) comprises a plurality of holes, a plurality of fixing means (6) and a plurality of first projections (9) protruding from the inner surface (4). In FIG. 2 three fixing means (6) are shown arranged along the access cover (1) and spaced apart between them. The fixing means (6) are configured to fix the access cover (1) to the supporting structure (10) of the aircraft hole (11) and each fixing means (6) comprises a male fixing element (7) and a locking element (8). The locking elements (8) comprise a threaded hole (8.1) (not visible in FIG. 2, but see FIG. 3) and an extended portion (8.2). The male fixing elements (7) have an outer threaded surface configured to thread with the threaded hole (8.1) of the locking elements (8). Each male fixing element (7) in FIG. 2 is arranged inserted through a hole of the access cover (1) and through a locking element (8). The male fixing elements (7) are inserted from the outer surface of the access cover (1).

In FIG. 2, each fixing means (6) is arranged in the lock position, i.e., the locking elements (8) are arranged with the extended portion (8.2) on the supporting structure (10) of the aircraft hole (11), and the male fixing element (7) is threaded in the threaded hole (8.1) of the locking element (8). The extended portion (8.2) of the locking element (8) is in contact with the supporting structure (10) of the aircraft hole (11) in order to maintain fixed the access cover (1) to the supporting structure (10).

Figure 3:
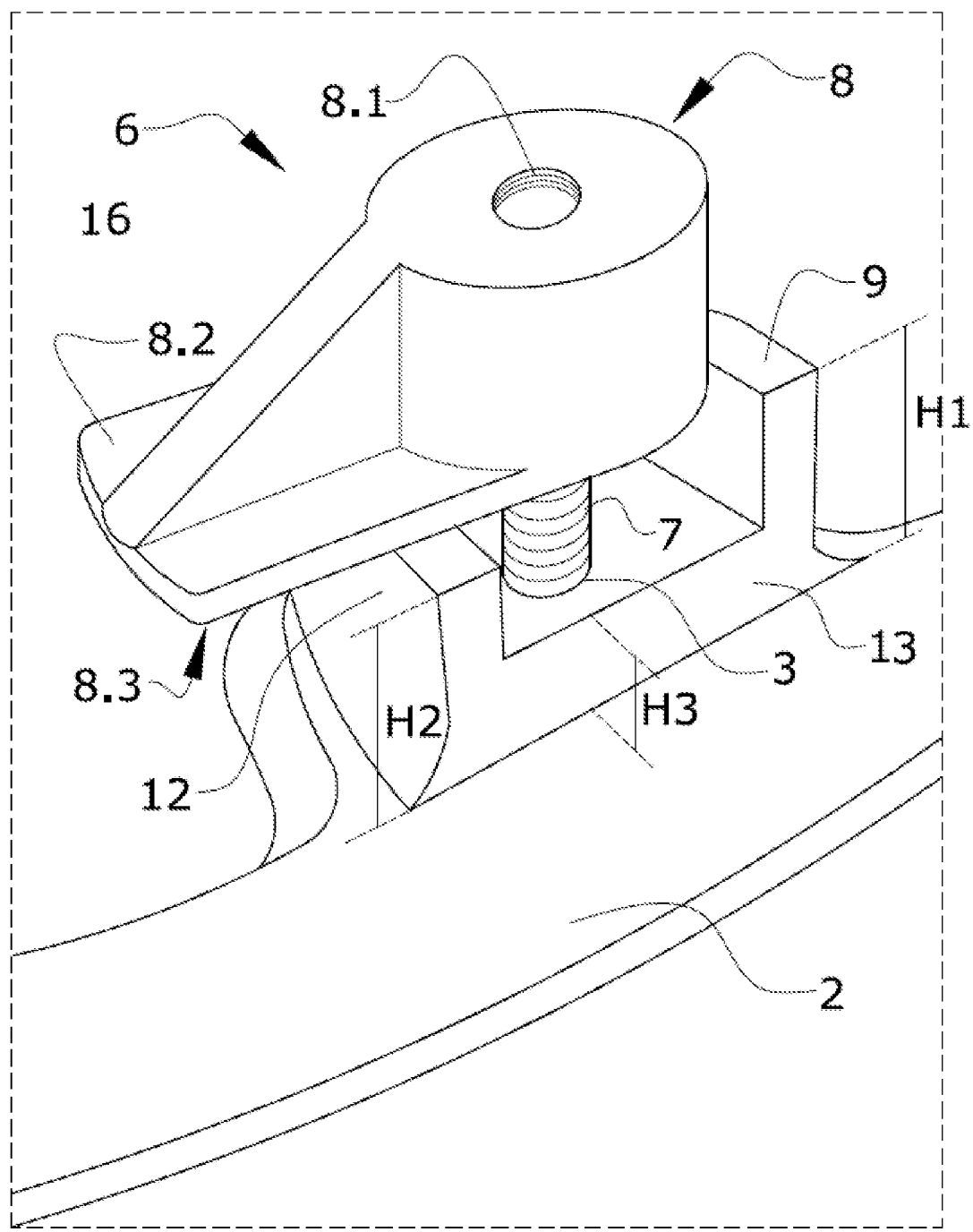
FIG. 3 shows a perspective view of a fixing means in a release position according to an embodiment of the present invention.

FIGS. 3, 4 and 5 show a particular embodiment of a fixing means (6) of the access cover (1) in different positions, respectively. In this particular example, each fixing means (6) comprises a male fixing element (7) and a locking element (8), where the male fixing element (7) is located inserted through the threaded hole (8.1) of the locking element (8). The locking element (8) comprises an extended portion (8.2) and a base (8.3) intended for being faced to the inner surface (4) of the access cover (1). Additionally, in this particular embodiment, the access cover (1) further comprises a central portion (16) and a peripheral portion (2) around such central portion (16). In this embodiment, the peripheral portion (2) has a thickness greater than the thickness of the central portion (16). In addition, the access cover (1) comprises a housing projected from the inner surface (4) and formed by a first (9) and second (12) projection and a wall (14) as a connection element between both projections (9, 12). The first (9) and second (12) projection respectively have a first (H1) and second (H2)

height relative to the inner surface (4). The access cover (1) also comprises an outstanding portion (13) located inside the housing and protruding from the inner surface (4) in the region where the hole (3) is located. The outstanding portion (13) comprises a third height (H3) relative to the inner surface (4). In these FIGS. 3, 4 and 5 it can be observed that the first height (H1) of the first projection (9) is greater than the second height (H2) of the second projection (12). Also, the third height (H3) of the outstanding portion (13) is less than the first (H1) and second (H2) height of the projections (9, 12) respectively.

FIG. 3 shows a fixing means (6) in the release position. In this particular release position, the male fixing element (7) is located threaded through the threaded hole (8.1) of the locking element (8) and the extended portion (8.2) of the locking element (8) is over the second projection (12) and the inner surface (4) of the access cover (1). When the male fixing element (7) is rotated from the outer surface, the friction between the male fixing element (7) and the locking element (8) causes the locking element (8) to rotate with the male fixing element (7) until the rotation of the locking element (8) is stopped by the first projection (9). FIG. 3 shows a situation where the male fixing element (7) and the locking element (8) are rotating together. In this particular example, the locking element (8) is positioned in such a way that its base (8.3) is at a height relative to the peripheral portion (2) less than the first height (H1) of the first projection (9).

In FIG. 3, the fixing means (6) is arranged in the release position which implies that together with the other fixing means (6) (not shown) in the same release position, the access cover (1) would be ready to be removed from or positioned on the aircraft hole (11).

FIG. 4 shows a fixing means (6) in the unlock position. From the position in FIG. 3, when the male fixing element (7) is further rotated in the lock direction, the first projection (9) stops the extended portion (8.2) of the locking element (8) and prevents further rotation of the locking element (8). In this unlock position, the male fixing element (7) is located threaded through the threaded hole (8.1) of the locking element (8) and the extended portion (8.2) of the locking element (8) is over the peripheral portion (2) of the access cover (1) and protrudes beyond such peripheral portion (2).

In this unlock position, the locking element (8) is positioned in such a way that its base (8.3) is at the same height as in the release position, that is because between the release and unlock position the locking element (8) rotates with the male fixing element (7) until such locking element (8) stops with the first projection (9). In this unlock position, further rotation of the male fixing element (7) in the lock direction causes the threading of the locking element (8) with the male fixing element (7).

In FIG. 4, the fixing means (6) is arranged in the unlock position which implies that together with the other fixing means (6) (not shown) in the same unlock position, the fixing means (6) would be ready to fix the access cover (1) to the supporting structure (10) of the aircraft hole (11). The supporting structure (10) (not shown in this figure) would be placed between the peripheral portion (2) of the access cover (1) and the extended portion (8.2) of the locking element (8).

From the position depicted in FIG. 4, further rotation of the male fixing element (7) in the lock direction leads to a position as depicted in FIG. 5, whereas rotation of the male fixing element (7) in the opposite direction (i.e., the release direction) would lead to the position depicted in FIG. 3.

In a particular example when the access cover (1) is positioned in the aircraft hole (11) and the fixing means (6) are in the unlock position, the locking element (8) cannot rotate in the lock direction but it can rotate in the release direction, and the extended portion (8.2) of the locking element (8) is not in contact with the supporting structure (10) of the aircraft hole (11), that is, a gap is provided between the locking element (8) and the supporting structure (10) of the aircraft hole (11).

FIG. 5 shows a fixing means (6) in the lock position. In this lock position, the male fixing element (7) is located threaded through the threaded hole (8.1) of the locking element (8) at the same time that the extended portion (8.2) of the locking element (8) is over the peripheral portion (2) of the access cover (1) and protrudes beyond such peripheral portion (2). Once the first projection (9) stops the rotational movement of the locking element (8), as depicted in FIG. 4, when the male fixing element (7) is further rotated in the lock direction, the male fixing element (7) is threaded through the locking element (8). In this position, threading of the locking element (8) on the male fixing element (7) causes a relative movement between the locking element (8) and the male fixing element (7), the locking element (8) approaching the head of the male fixing element (7) as the male fixing element (7) is further rotated in the lock direction.

In FIG. 5, a portion of the male fixing element (7) can be seen protruding above the locking element (8). In this particular position, the locking element (8) is positioned in such a way that its base (8.3) is at a height that is less than the first (H1) and second (H2) height of the first (9) and second (12) projection, respectively. This is because between the unlock position and the lock position the male fixing element (7) further threads through the threaded hole (8.1) of the locking element (8) and such locking element (8) moves towards the inner surface (4), being guided by the first projection (9) and the second projection (12). With an orientation as depicted in FIG. 5 this would correspond to a vertical movement of the locking element (8) downwards.

In FIG. 5, the fixing means (6) is arranged in the lock position which implies that together with the other fixing means (6) (not shown) in the same lock position, the fixing means (6) fix the access cover (1) to the supporting structure (10) of the aircraft hole (11) and the fixing means (6) are kept locked in a position between by the first projection (9) and the second projection (12).

Figure 6:
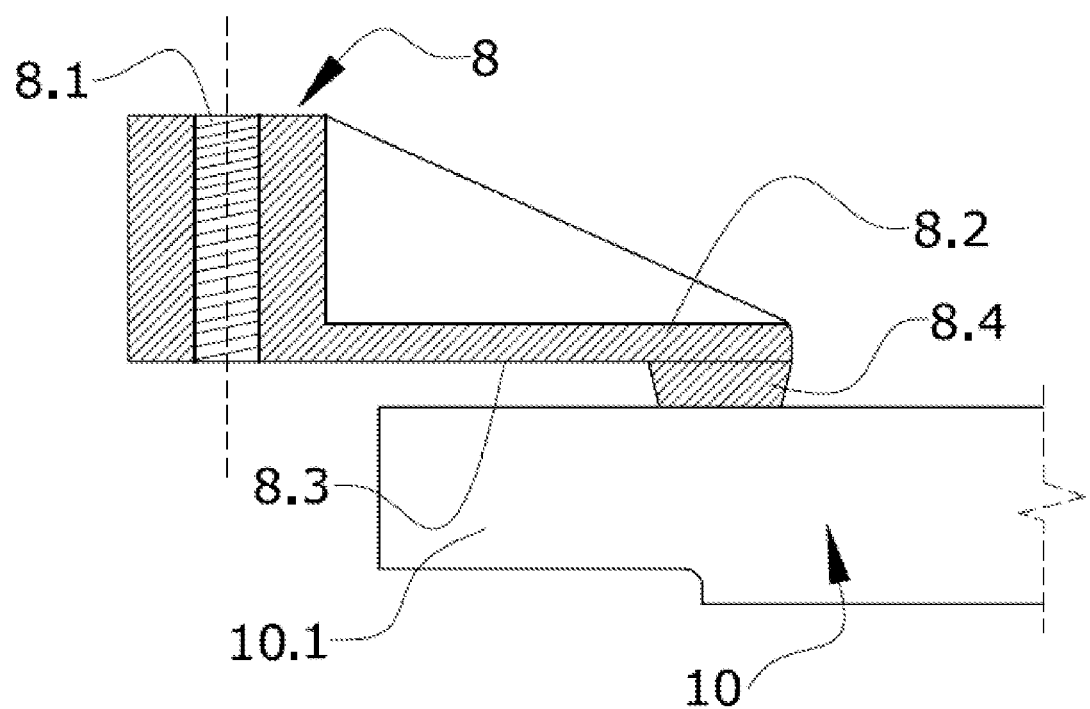
FIG. 6 shows a cross section view of the locking element in contact with the supporting structure according to an embodiment of the present invention.

FIG. 6 shows a cross sectional view of an embodiment of a locking element (8) comprising a third projection (8.4) protruding from its base (8.3). As it can be observed, this third projection (8.4) is in contact with the supporting structure (10) when the access cover (1) is fixed to the supporting structure (10). In addition, it can be observed that the locking element (8) does not contact the edge region (10.1) of the supporting structure (10) of the aircraft hole (11).

For a better understanding of the operation of the fixing means (6), the procedure for fastening the access cover (1) to a supporting structure (10) of an aircraft hole (11) is explained in stages below for an embodiment as depicted in FIGS. 3 to 5.

Positioning the access cover (1) on the aircraft hole (11) in such a way that the central portion (16) of the inner surface (4) is faced inside the aircraft hole (11) and a region of the supporting structure (10) gets in touch with the peripheral portion (2) of the access cover (1).

Starting to rotate the male fixing element (7) in a first threading direction which corresponds to the lock direction, in such a way that the locking element (8) starts rotating (over the second projection (12)) with the male fixing element (7) in a lock direction until the rotational movement of the locking element (8) is stopped by the first projection (9).

Once the rotational movement of the locking element (8) in the lock direction is blocked by the first projection (9), the male fixing element (7) continues threading through the threaded hole (8.1) of the locking element (8) so that the locking element (8) starts displacing through the male fixing element (7) until it is housed in the housing formed by the first projection (9), the second projection (12) and the wall (14). The displacement of the locking element (8) is because the first projection (9) stops the rotation of the locking element (8).

Further threading the male fixing element (7) so that the locking element (8) continues displacing until contact with the supporting structure (10) of the aircraft hole (11). When the locking elements (8) of the plurality of fixing means (6) are in contact with the supporting structure (10) then the access cover (1) is fixed to such supporting structure (10) of the aircraft hole (11).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An access cover for an aircraft hole comprising:
   a plurality of access cover holes,
   an inner surface configured to face towards the aircraft hole,
   a plurality of first projections protruding from the inner surface, and
   a plurality of fixing elements configured to fix the access cover to a supporting structure of the aircraft hole, each fixing element comprising:
      a male fixing element having an outer threaded surface, the male fixing element being configured to pass through one of the plurality of access cover holes, and
      a locking element comprising a threaded hole and an extended portion, wherein the outer threaded surface of the male fixing element is configured to thread with the threaded hole of the locking element,
   wherein the male fixing elements, the locking elements and the first projections are configured such that when a male fixing element inserted through an access cover hole and through a locking element is rotated in a lock direction, friction between the male fixing element and the locking element causes the locking element to rotate with the male fixing element until rotational movement of the locking element is stopped by one of the first projections, and further rotation of the male fixing element in the lock direction causes a threading of the locking element with the male fixing element, the access cover further comprising a plurality of second projections protruding from the inner surface, wherein each second projection is configured to limit the rotational movement of the locking element when the male fixing element inserted through the one of the plurality of access cover holes and through the locking element is rotated in a release direction, the release direction being opposite to the lock direction, and wherein the first projection has a first height with respect to the inner surface and the second projection has a second height with respect to the inner surface, the second height being smaller than the first height,
   wherein each second projection defines, together with a first projection, a housing comprising a wall extending from the first projection to the second projection, and
   wherein the wall of the housing has a height with respect to the inner surface which monotonically increases from the second projection to the first projection.

2. The access cover according to claim 1, wherein the inner surface comprises a peripheral portion suitable for being supported on the supporting structure of the aircraft hole.

3. The access cover according to claim 2, wherein in a position where the rotational movement of the locking element is limited by the one of the plurality of first projections, an extended portion of the locking element is positioned over a peripheral portion of the access cover.

4. The access cover according to claim 3, wherein in a position where the rotational movement of the locking element is limited by the one of the plurality of first projections, the extended portion of the locking element protrudes beyond the peripheral portion of the access cover.

5. The access cover according to claim 2, wherein a central portion of the access cover has a thickness less than a thickness at a peripheral portion of the access cover.

6. The access cover according to claim 1, further comprising a plurality of outstanding portions, wherein each outstanding portion protrudes from the inner surface and wherein each of the plurality of access cover holes is located in an outstanding portion.

7. The access cover according to claim 3, wherein the extended portion of the locking element comprises a third projection configured to contact the supporting structure of the aircraft hole.

8. An aircraft comprising:
   at least one aircraft hole, and
   an access cover according to claim 1.

* * * * *